United States Patent
Kim et al.

(10) Patent No.: US 12,477,252 B2
(45) Date of Patent: Nov. 18, 2025

(54) DYNAMIC VISION SENSOR IN LOW LIGHT ENVIRONMENT AND THE OPERATING METHOD THEREOF

(71) Applicant: Samsung Electronics Co., Ltd., Suwon-si (KR)

(72) Inventors: Junseok Kim, Suwon-si (KR); Raeyoung Kim, Suwon-si (KR); Keun Joo Park, Suwon-si (KR); Bongki Son, Suwon-si (KR); Se-Hoon Lim, Suwon-si (KR); Hee-Jae Jo, Suwon-si (KR)

(73) Assignee: Samsung Electronics Co., Ltd., Gyeonggi-do (KR)

(*) Notice: Subject to any disclaimer, the term of this patent is extended or adjusted under 35 U.S.C. 154(b) by 157 days.

(21) Appl. No.: 18/486,372

(22) Filed: Oct. 13, 2023

(65) Prior Publication Data

US 2024/0348950 A1 Oct. 17, 2024

(30) Foreign Application Priority Data

Apr. 11, 2023 (KR) .................. 10-2023-0047376

(51) Int. Cl.
*H04N 25/79* (2023.01)
*H04N 25/47* (2023.01)
*H04N 25/77* (2023.01)

(52) U.S. Cl.
CPC ............ *H04N 25/79* (2023.01); *H04N 25/47* (2023.01); *H04N 25/77* (2023.01)

(58) Field of Classification Search
CPC ........ H04N 25/79; H04N 25/47; H04N 25/77; H04N 25/707
See application file for complete search history.

(56) References Cited

U.S. PATENT DOCUMENTS

| | | |
|---|---|---|
| 5,229,623 A | 7/1993 | Tanoue et al. |
| 7,586,076 B2 | 9/2009 | Silsby |
| 9,385,158 B2 | 7/2016 | Lim |
| 9,456,153 B2 | 9/2016 | Pang et al. |
| 9,681,081 B2 | 6/2017 | Serrano Gotarredona et al. |
| 9,716,850 B2 | 7/2017 | Pang et al. |

(Continued)

FOREIGN PATENT DOCUMENTS

| | | |
|---|---|---|
| JP | 2000-0244005 A | 9/2000 |
| JP | 3122078 B2 | 1/2001 |

*Primary Examiner* — Gevell V Selby
(74) *Attorney, Agent, or Firm* — Harness, Dickey & Pierce, P.L.C.

(57) ABSTRACT

A dynamic vision sensor (DVS) including a plurality of substrates electrically connected to one another and stacked vertically includes a photoelectric conversion device configured to generate charges in response to incident light from an external environment that is external to the DVS sensor, a bipolar junction transistor (BJT) device including a base connected to the photoelectric conversion device and configured to output a current based on amplifying a current output from the photoelectric conversion device, and a DVS pixel circuit that detects a change in intensity of the incident light and to output an event signal based on the current. The photoelectric conversion device is on a first substrate among the plurality of substrates. At least part of the DVS pixel circuit is on a different substrate from the first substrate among the plurality of substrates.

20 Claims, 11 Drawing Sheets

(56) References Cited

U.S. PATENT DOCUMENTS

| | | |
|---|---|---|
| 10,491,849 B2 | 11/2019 | Pang et al. |
| 10,992,897 B2 | 4/2021 | Pang et al. |
| 11,240,461 B2 | 2/2022 | Pang et al. |
| 2005/0189476 A1 | 9/2005 | Kim et al. |
| 2011/0079708 A1 | 4/2011 | Hsin et al. |
| 2023/0164461 A1* | 5/2023 | Suh ........................ H04N 25/77 348/207.99 |
| 2023/0224605 A1* | 7/2023 | Kodama ................ H04N 25/79 348/207.99 |
| 2024/0114255 A1* | 4/2024 | Kaizu .................... H04N 25/47 |

* cited by examiner

DYNAMIC VISION SENSOR IN LOW LIGHT ENVIRONMENT AND THE OPERATING METHOD THEREOF

CROSS-REFERENCE TO RELATED APPLICATIONS

This application claims priority under 35 U.S.C. § 119 to Korean Patent Application No. 10-2023-0047376 filed on Apr. 11, 2023, in the Korean Intellectual Property Office, the disclosures of which are incorporated by reference herein in their entireties.

BACKGROUND

Example embodiments of the present inventive concepts described herein relate to dynamic vision sensors (DVS) in consideration of a low-light environment.

An image sensor is a device that converts a light signal into an electrical signal, and may include a charge coupled device (CCD) image sensor, a complementary metal oxide semiconductor (CMOS) image sensor, and a DVS sensor.

The CMOS image sensor generates an image frame signal that has a frame format of the captured image. On the other hand, the DVS sensor generates an event signal by detecting only an event, in which the intensity of light is changed. On the other hand, a pixel of the DVS sensor is greater than a pixel of a CMOS image sensor (CIS).

In the DVS sensor in a low-light environment, it takes more time for an event to occur due to a decrease in a current flowing through a photoelectric conversion device. Accordingly, a phenomenon such as drag of an object is present in an image created based on the event signal.

SUMMARY

Some example embodiments of the present inventive concepts provide a DVS sensor that reduces or minimizes a time required to generate an event signal of a DVS sensor in a low-light environment.

According to some example embodiments, a dynamic vision sensor (DVS) sensor including a plurality of substrates electrically connected to one another and stacked vertically may include a photoelectric conversion device configured to generate charges in response to incident light from an external environment that is external to the DVS sensor, a bipolar junction transistor (BJT) device including a base connected to the photoelectric conversion device and configured to output a current based on amplifying a current output from the photoelectric conversion device, and a DVS pixel circuit that is configured to detect a change in intensity of the incident light and to output an event signal based on the current. The photoelectric conversion device may be on a first substrate among the plurality of substrates. At least part of the DVS pixel circuit may be on a different substrate from the first substrate among the plurality of substrates.

According to some example embodiments, a DVS sensor including a plurality of substrates electrically connected to each other and stacked vertically may include a first photoelectric conversion device and a second photoelectric conversion device, each of the first photoelectric conversion device and the second photoelectric conversion device configured to generate charges in response to incident light from an external environment that is external to the DVS sensor, a transistor array that is configured to output an analog image frame signal based on a charge generated by the first photoelectric conversion device, a BJT device connected to the second photoelectric conversion device, a DVS pixel circuit that is configured to output an event signal based on a photocurrent output based on the BJT device amplifying a current flowing to the second photoelectric conversion device, and an image logic circuit that converts the analog image frame signal into a digital image frame signal. The first photoelectric conversion device and the second photoelectric conversion device may be on a first substrate among the plurality of substrates, at least part of the DVS pixel circuit may be on a second substrate among the plurality of substrates, the image logic circuit may be on a third substrate among the plurality of substrates, and the second substrate may be between the first substrate and the third substrate.

According to some example embodiments, an operating method of a DVS sensor including a plurality of substrates electrically connected to each other and stacked vertically may include generating, by a photoelectric conversion device on a first substrate among the plurality of substrates, charges in response to incident light from an external environment that is external to the DVS sensor, outputting, by a BJT device having a base connected to the photoelectric conversion device, a photocurrent based on amplifying a current flowing in the photoelectric conversion device, and outputting, by a DVS pixel circuit on a different substrate from the first substrate among the plurality of substrates, an event signal based on the photocurrent output by the BJT device.

BRIEF DESCRIPTION OF THE DRAWINGS

The above and other objects and features of the present inventive concepts will become apparent by describing in detail some example embodiments thereof with reference to the accompanying drawings.

DETAILED DESCRIPTION

Hereinafter, some example embodiments of the present inventive concepts may be described in detail and clearly to such an extent that one having ordinary skill in the relevant art easily implements the present inventive concepts.

As described herein, when an operation is described to be performed, or an effect such as a structure is described to be established "by" or "through" performing additional operations, it will be understood that the operation may be performed and/or the effect/structure may be established "based on" the additional operations, which may include performing said additional operations alone or in combination with other further additional operations.

Figure 1:
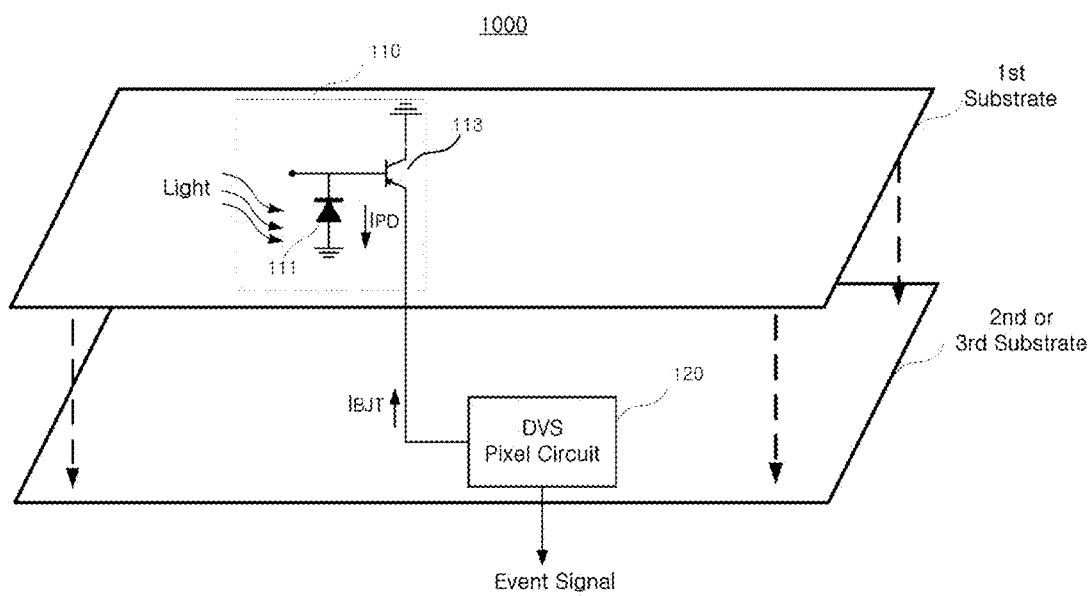
FIG. 1 is a block diagram showing a DVS pixel and a DVS pixel circuit of a stacked DVS sensor, according to some example embodiments of the present inventive concepts.

FIG. 1 is a block diagram showing a DVS pixel 110 and a DVS pixel circuit of a stacked DVS sensor 1000, according to some example embodiments of the present inventive concepts. Referring to FIG. 1, the stacked DVS sensor 1000 includes the DVS pixel 110 and a DVS pixel circuit 120.

The DVS sensor 1000 may include a plurality of substrates. The DVS pixel 110 may be disposed on a first substrate among the plurality of substrates. At least part of the DVS pixel circuit 120 may be disposed on a second substrate or a third substrate other than the first substrate. FIG. 1 shows that the second substrate or the third substrate is one substrate. However, the second substrate or the third substrate may include a plurality of substrates. On the basis of an incident direction of a light signal, the first substrate may be positioned on and/or may at least partially define a top surface of the DVS sensor 1000; the third substrate may be positioned on and/or may at least partially define a lower surface of the DVS sensor 1000; and the second substrate may be positioned between the first and third substrates. It will be understood that an element described herein to be "on", "positioned on," or "disposed on" a given substrate may be connected to the given substrate (e.g., directly connected to the given substrate), in direct contact with a surface of the given substrate, at least partially integrated into the given substrate, any combination thereof, or the like.

The DVS pixel 110 outputs (e.g., transmits) a current IBJT based on charges generated in proportion to the incident light signal, and the outputted current IBJT is provided to the DVS pixel circuit 120. In this specification, the output of a current does not mean the direction of the current.

In some example embodiments of the present inventive concepts, the DVS pixel 110 includes a photoelectric conversion device 111 and a bipolar junction transistor (BJT) device 113.

The photoelectric conversion device 111 may be a photodiode (PD). The photodiode PD is a kind of photoelectric conversion device that generates charges in proportion to the light signal incident from the outside and accumulates the generated charges. The photoelectric conversion device 111 is one of the photodiode PD, a photocapacitor, a photogate, a pinned photodiode PPD, and a partially pinned photodiode, or any combination thereof. Some example embodiments of the present specification are described on the premise that the photoelectric conversion device 111 is the photodiode PD. However, other photoelectric conversion devices described above may be used, but are not limited to the photodiode PD.

In the photoelectric conversion device 111, a current IPD flows based on the charges generated in proportion to the incident light signal.

The photoelectric conversion device 111 is connected to a base of the BJT device 113. A base current is amplified, and a collector current flows in a collector of the BJT device 113. A current obtained by summing the collector current and the base current flows to an emitter of the BJT device 113. The current IBJT (IBJT=($\beta$+1)IPD; $\beta$=collector current/base current) output from the DVS pixel 110 and supplied to the DVS pixel circuit is greater than a current flowing through the photoelectric conversion device, such that the BJT device 113 may be understood to be configured to amplify the current output from the photoelectric conversion device 111. Accordingly, it is possible to reduce, minimize, or prevent a drag phenomenon of an object in an image generated by the DVS sensor 1000 based on a charge generated by one or more photoelectric conversion devices 111 of the DVS sensor 1000 due to a decrease in a current flowing through the photoelectric conversion device in a low-light environment. The DVS sensor 1000 may be in a low-light environment when the DVS sensor 1000 is located in an external environment (also referred to as an ambient environment) having a low ambient illumination (also referred to herein as simply a low illumination) such that the illumination and/or illuminance of light in the external environment is less than a threshold illumination and/or illuminance. It will be understood that a threshold value or magnitude (also referred to herein as a reference value or magnitude), such as a threshold illumination, a threshold illuminance, or the like, may be a design parameter that may be empirically determined.

Conventional DVS pixel generates an event signal based on increases or decreases of a current flowing through a photoelectric conversion device. However, it is difficult for conventional DVS pixel to detect an increase or decrease of a current flowing through a photoelectric conversion device because the current flowing through a photoelectric conversion device in a low-light environment is very small. Therefore, it takes a long time for conventional DVS pixel circuit to generate an event signal. Therefore, a drag phenomenon occurs in an event signal based on the conventional DVS pixel. In contrast, the DVS pixel circuit 120 of the DVS sensor 1000 according to an embodiment of the present invention is provided with the current IBJT greater than the current flowing through the photoelectric conversion element 111. Therefore, a short period of time is required for the DVS pixel circuit 120 to generate the event signal. Accordingly, a drag phenomenon in the event signal from the DVS pixel 110 is reduced.

The DVS pixel circuit 120 receives the current IBJT (also referred to herein as a current that is output from the BJT device 113, a photocurrent that is output from the BJT device 113, or the like), converts the current IBJT into a voltage, detects a change in intensity of a light signal, and outputs the intensity change of the light signal as an event signal. In a case where the intensity of the light signal increases, and/or a case where the intensity of the light signal decreases, the DVS pixel circuit 120 may output different event signals. The DVS pixel circuit 120 will be described with reference to FIG. 3.

In some example embodiments of the present inventive concepts, the DVS sensor 1000 may be a stacked DVS sensor including a plurality of vertically stacked substrates electrically connected to each other.

The DVS pixel 110 may be positioned on the first substrate among the plurality of substrates, and the DVS pixel circuit 120 may be positioned on another substrate electrically connected to the first substrate. When the stacked DVS sensor 1000 includes the first substrate, the second substrate, and the third substrate, the DVS pixel circuit 120 may be positioned on either the second substrate or the third substrate. In some example embodiments, a portion of the DVS pixel circuit 120 may be positioned on the second substrate, and one or more other portions of the DVS pixel circuit 120 may be positioned on the third substrate.

When the DVS pixel circuit 120 is positioned on the second substrate, a CMOS image sensor (CIS) image logic circuit may be positioned on the third substrate.

Figure 13:
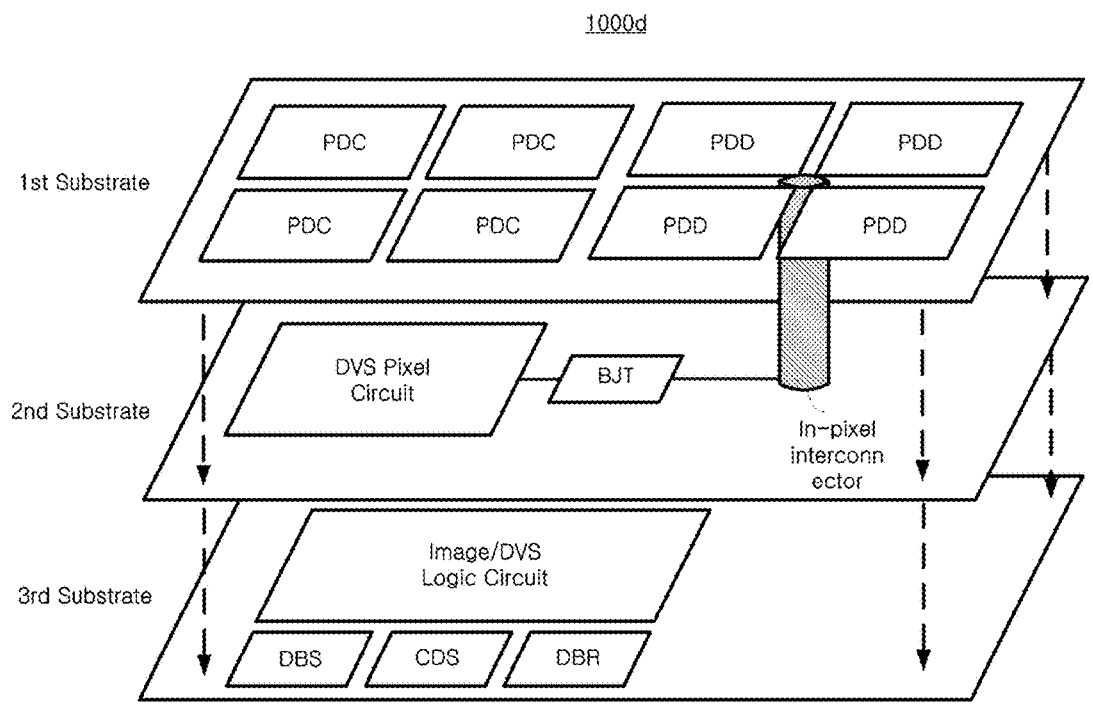
FIG. 13 is a block diagram of a DVS sensor including a plurality of substrates, according to some example embodiments of FIG. 12.

Among the stacked substrates, the first substrate and the second substrate may be electrically connected to each other through an in-pixel interconnector (e.g., as shown in FIG. 13). For example, pixels on the first substrate and a pixel circuit on the second substrate may be electrically connected through in-pixel Cu-to-Cu (C2C) bonding or in-pixel through-silicon-via (TSV). A pixel circuit of the second substrate and a logic circuit of the third substrate may be electrically connected through the in-pixel C2C bonding or the in-pixel TSV. The first substrate and the third substrate may be connected to a TSV. Example embodiments of the present inventive concepts do not specifically limit a method of stacking a substrate.

A CIS pixel may share the photoelectric conversion device 111 of the DVS pixel 110 and may generate an analog image frame signal based on charges generated by the photoelectric conversion device 111 of the DVS pixel 110. Hereinafter, this will be described in detail with reference to FIGS. 7 and 9. The CIS pixel may be positioned on the first substrate along with the DVS pixel 110.

Figure 2:
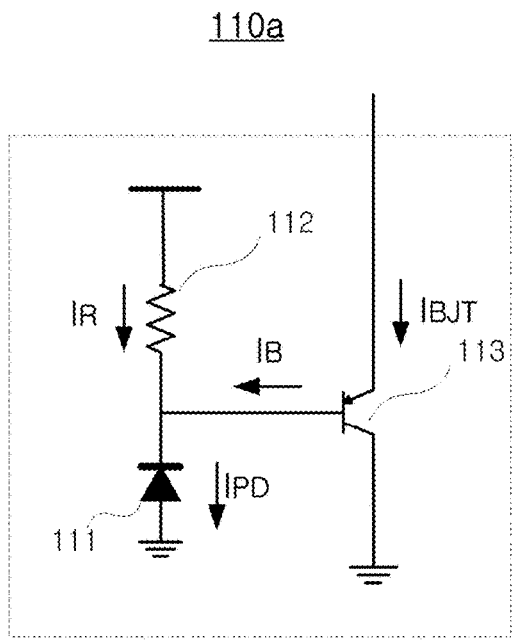
FIG. 2 is a circuit diagram of a DVS pixel, according to some example embodiments of the present inventive concepts.

FIG. 2 is a circuit diagram of a DVS pixel 110*a*, according to some example embodiments of the present inventive concepts. Referring to FIG. 2, the DVS pixel 110*a* includes the photoelectric conversion device 111, a resistor 112, and the BJT device 113. Portions identical or similar to those described with reference to the previous drawings are simply described or omitted.

The photoelectric conversion device 111 of the DVS pixel 110*a* according to some example embodiments of the present inventive concepts is connected to the base of the BJT device 113 and the resistor 112. The base of the BJT device 113 is connected to the same resistor 112 to which the photoelectric conversion device 111 is connected.

The current IPD flowing to the photoelectric conversion device 111 including the sum of a current IR flowing through the resistor and a base current (IB=α IPD) of the BJT device 113. Accordingly, a current (IBJT=(β+1) α IPD; β=collector current/base current) output from the DVS pixel 110 and then supplied to the DVS pixel circuit 120 flows. The base current IB of the BJT device 113 is smaller than the current IPD flowing through the photoelectric conversion device 111. As a result, the current IBJT output from the DVS pixel 110 and supplied to the DVS pixel circuit is smaller than the current (IBJT=(β+1) IPD) described with reference to FIG. 1, and is provided to the DVS pixel circuit 120. Accordingly, it is possible to adjust the sensitivity of the DVS sensor 1000 to a light change (e.g., a change in intensity of incident light that is incident on the DVS sensor from an external environment), and to guarantee the output of a normal event signal of the DVS pixel circuit 120 even in high illumination (e.g., even when the illumination of the external environment, as may be indicated by an intensity of the incident light, is equal to or greater than a particular reference illumination). As a result, the functionality of the DVS sensor may be improved, to more quickly and reliably adapt to changes in the external environment illumination and thus to reduce, minimize, or prevent object drag in images generated by the DVS sensor 1000, based on the DVS sensor being configured to adjust the current output from a DVS pixel of the DVS sensor to a DVS pixel circuit of the DVS sensor according to changes in the external environment illumination and/or illuminance.

Figure 3:
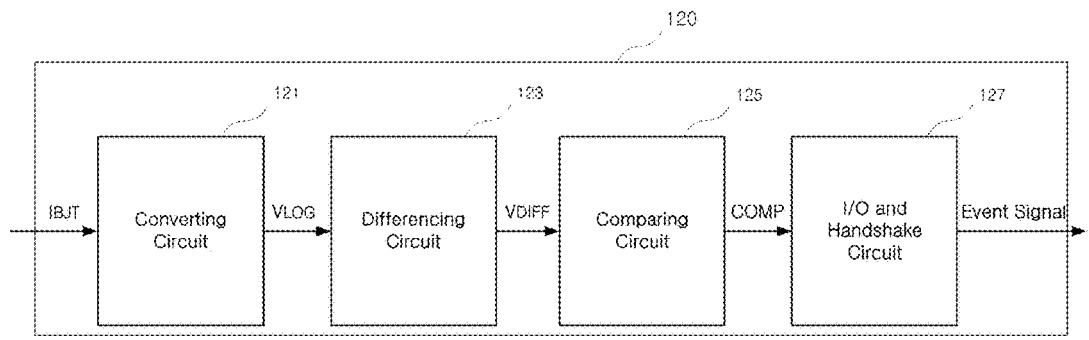
FIG. 3 is a block diagram of a DVS pixel circuit, according to some example embodiments of the present inventive concepts.
Figure 4:
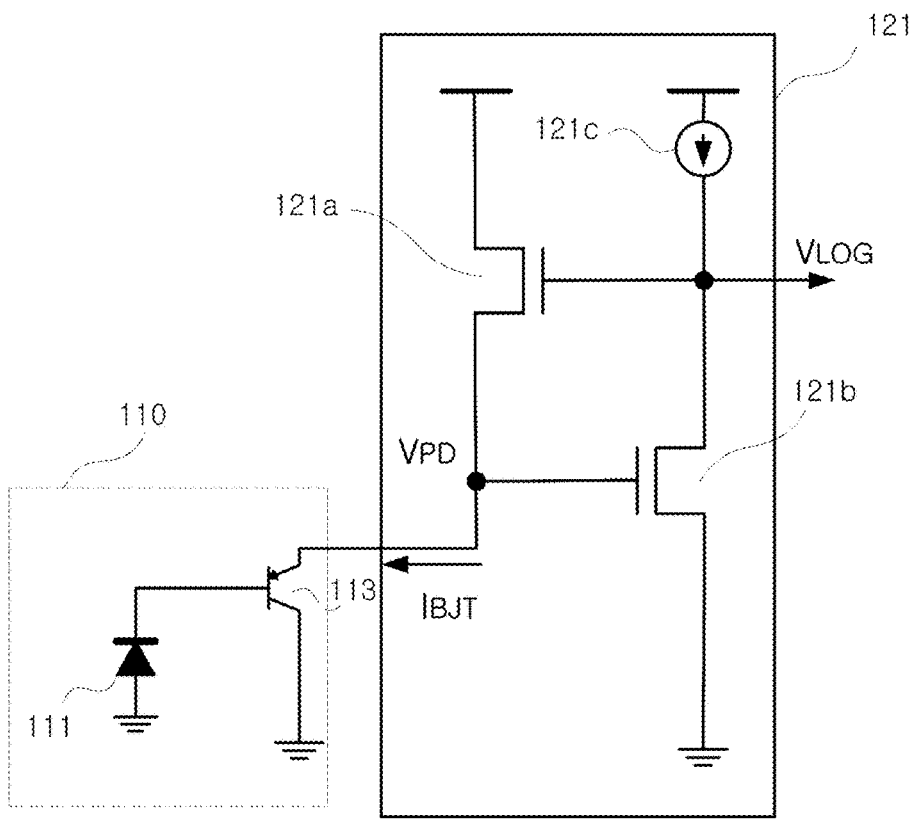
FIG. 4 is a circuit diagram of a converting circuit of a DVS pixel circuit, according to some example embodiments of the present inventive concepts.
Figure 5:
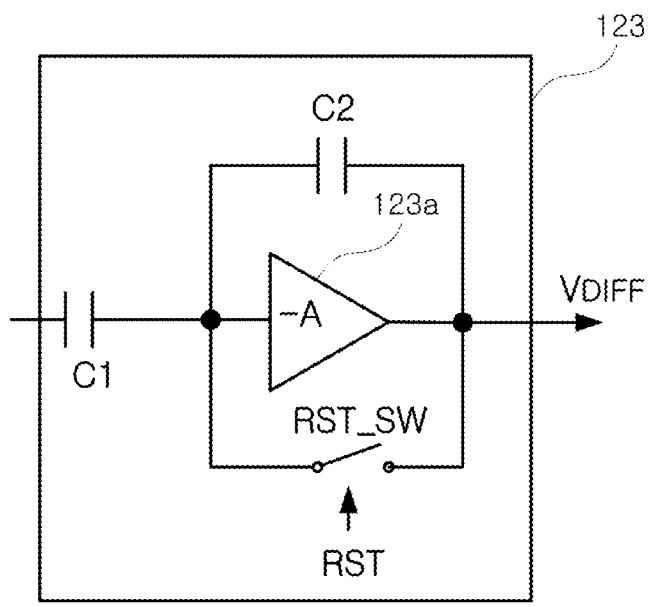
FIG. 5 is a circuit diagram of a differencing circuit of a DVS pixel circuit, according to some example embodiments of the present inventive concepts.

FIG. 3 is a block diagram of the DVS pixel circuit 120, according to some example embodiments of the present inventive concepts. FIG. 4 is a circuit diagram of a converting circuit of a DVS pixel circuit, according to some example embodiments of the present inventive concepts. FIG. 5 is a circuit diagram of a differencing circuit of a DVS pixel circuit, according to some example embodiments of the present inventive concepts.

Referring to FIG. 3, the DVS pixel circuit 120 may include a converting circuit 121, a differencing circuit 123, a comparing circuit 125, and an input/output (I/O) and handshake circuit 127.

The converting circuit 121 receives a current from DVS pixel (e.g., DVS pixel 110) and then converts the current to a voltage. The converting circuit 121 may logarithmically convert the current provided from the DVS pixel into the voltage. Accordingly, the converting circuit 121 may output a log voltage VLOG, which is an output voltage having a log scale (e.g., a logarithmic scale voltage).

Referring to FIG. 4, the converting circuit 121 will be described in detail. The converting circuit 121 includes a first transistor 121*a*, a second transistor 121*b*, and a current source 121*c*. A drain node of the first transistor 121*a* may be connected to supply power. A source node of the first transistor 121*a* may be connected to a gate node of the second transistor 121*b* and the DVS pixel 110. As described above, the DVS pixel 110 is present on a different substrate. The source of the second transistor 121*b* is connected to a ground to have a common source amplification structure. A gate node of the first transistor 121*a* may be connected to the differencing circuit 123. In some example embodiments, as in descriptions given below with reference to FIG. 9, a gate node of the first transistor 121*a* may be connected to a voltage buffer circuit 122.

According to some example embodiments, the converting circuit 121 may be positioned on a substrate on which a DVS pixel is positioned, or on another substrate on which a DVS pixel is not positioned.

Referring back to FIG. 3, the differencing circuit 123 may receive the log voltage VLOG from the converting circuit 121 and may generate a voltage VDIFF obtained by amplifying the log voltage VLOG. In some example embodiments, the differencing circuit 123 may generate the voltage VDIFF obtained by amplifying the voltage received from the voltage buffer circuit 122.

Referring to FIG. 5, the differencing circuit 123 will be described in detail. The differencing circuit 123 includes a first capacitor C1, a second capacitor C2, an operational amplifier 123*a*, and a reset switch RST_SW.

The differencing circuit 123 is connected to the converting circuit 121 or the voltage buffer circuit 122 (shown in FIG. 9) through the first capacitor C1. The second capacitor C2 is connected between the input and output of the operational amplifier 123a. The reset switch RST_SW is connected in parallel with the second capacitor C2 between the input and output of the operational amplifier 123a. The reset switch RST_SW is closed in response to a reset signal RST, and the differencing circuit 123 is initialized.

The differencing circuit 123 amplifies an input voltage received from the converting circuit 121 or the voltage buffer circuit 122 depending on a capacitance ratio between the first capacitor C1 and the second capacitor C2. The capacitance of each of the first capacitor C1 and the second capacitor C2 may be selected in consideration of an amplification ratio and a time interval of continuous event occurrence.

Referring back to FIG. 3, the comparing circuit 125 compares the level (e.g., magnitude) of the output voltage VDIFF of the differencing circuit 123 and a level (e.g., magnitude) of a received reference voltage VREF. On the basis of the comparison result, the comparing circuit 125 outputs a comparison signal COMP for determining whether the intensity of light incident onto the DVS pixel (e.g., incident light on the DVS pixel from an external environment that is external to the DVS pixel) increases or decreases. When (e.g., in response to a determination that) the intensity of light (e.g., light incident onto the DVS pixel) increases, the comparing circuit 125 may output an ON signal as the comparison signal COMP. When (e.g., in response to a determination that) the intensity of light (light incident onto the DVS pixel from the external environment) decreases, the comparing circuit 125 may output an OFF signal as the comparison signal COMP. The comparing circuit 125 may include a plurality of comparators. The plurality of comparators may have different reference voltages for determining the ON signal and the OFF signal. It will be understood that a reference voltage as described herein may be a design parameter that may be empirically determined.

The I/O and handshake circuit 127 asynchronously generates an event signal based on the comparison signal COMP of the comparing circuit 125. The I/O and handshake circuit 127 may output the event signal based on a handshake protocol. Additionally or alternatively, in some example embodiments, the I/O and handshake circuit 127 may output the event signal in response to an external signal for requesting the output of an event signal from an external device. In some example embodiments, the I/O and handshake circuit 127 may include a DVS logic circuit 130 of FIG. 6. The I/O and handshake circuit 127 may output a signal RST for resetting the reset switch RST_SW of the differencing circuit 123 based on the comparison signal COMP. In other words, when (e.g., in response to a determination that) the comparison signal COMP is one of the ON signal or the OFF signal, the I/O and handshake circuit 127 may generate the reset signal RST. In some example embodiments, a logic circuit generating the reset signal RST may be implemented as a separate device.

Figure 6:
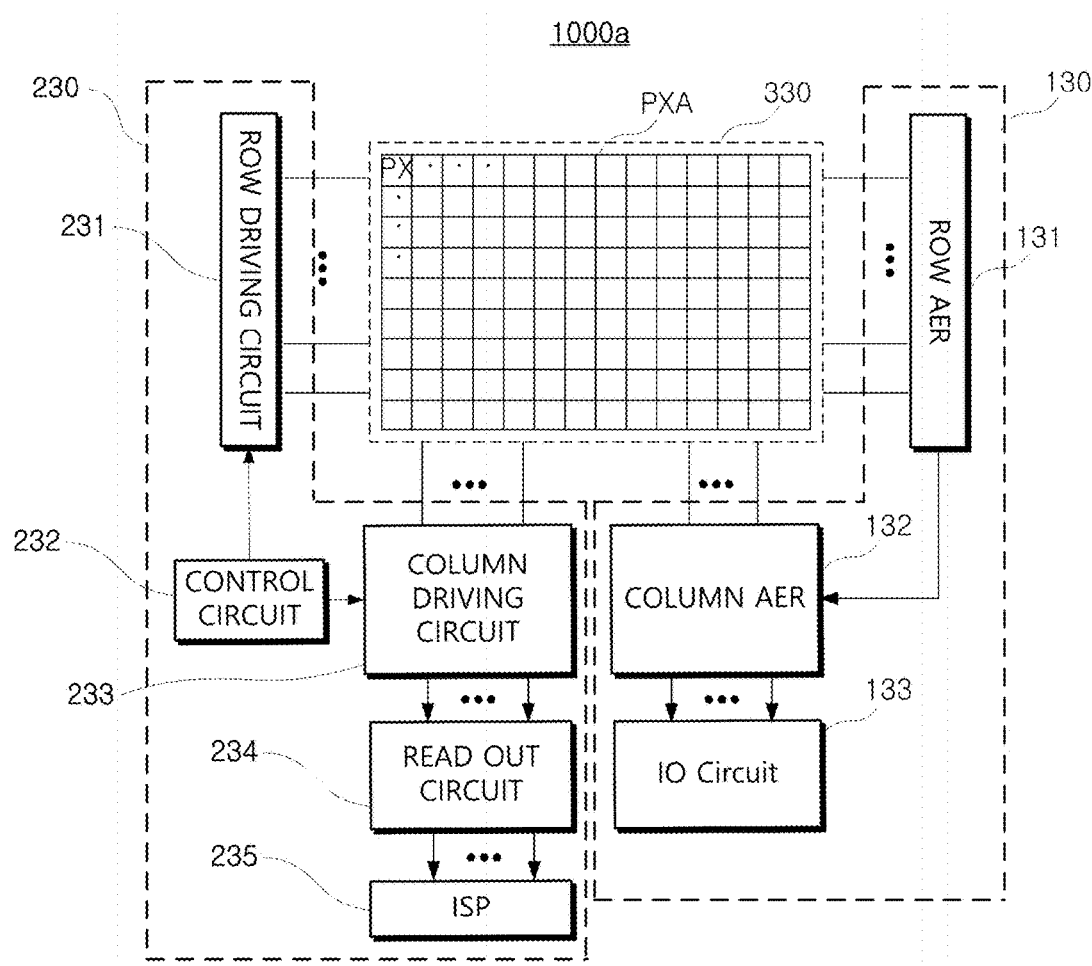
FIG. 6 is a block diagram of a DVS sensor, according to some example embodiments of the present inventive concepts.

FIG. 6 is a block diagram of a DVS sensor 1000a, according to some example embodiments of the present inventive concepts.

The DVS sensor 1000a includes a pixel array PXA, the DVS logic circuit 130, and an image logic circuit 230.

The pixel array PXA may include the DVS pixels described with reference to FIGS. 1 and 2.

In each pixel PX of the pixel array PXA, a CIS pixel and a DVS pixel may include a separate light conversion device, or may share the light conversion device described with reference to FIGS. 1 and 2.

The pixel array PXA includes at least one of DVS pixels according to some example embodiments of the present inventive concepts.

The pixel array PXA includes a plurality of pixels PX arranged two-dimensionally, and is formed in an active area 330 of a substrate. Each of the plurality of pixels PX may be the CIS pixel or the DVS pixel.

According to some example embodiments of the present inventive concepts, among a plurality of substrates on each of which a light conversion device of the pixel array PXA is stacked, the DVS sensor 1000 may be disposed on a first substrate; at least part of the DVS logic circuit 130 may be disposed on a second substrate; and the image logic circuit 230 may be disposed on a third substrate.

According to some example embodiments of the present inventive concepts, the pixel PX is described on the premise that the pixel PX uses a back side illumination (BSI) method in which the light signal is incident through the back surface (BS) of a substrate. Furthermore, a light conversion device (e.g., a photoelectric conversion device) may be shared between a CIS pixel and a DVS pixel or may be present separately for each CIS pixel and DVS pixel.

The DVS logic circuit 130 generates an event signal for an increase or decrease in the light signal (e.g., an event signal indicating an increase or decrease in the intensity of the incident light on at least one DVS pixel) based on the charge generated by the photoelectric conversion device. The event signal may include (e.g., may include information indicating) the type of an event, an address of a pixel at which an event occurs, and a time stamp. The time stamp may be generated by the DVS logic circuit 130 based on a sync signal SYNC provided by the image logic circuit 230. In some example embodiments, a DVS sync signal may be generated within the DVS logic circuit 130 based on the sync signal SYNC provided by the image logic circuit 230. The time stamp may be generated based on the DVS sync signal. In some example embodiments, the sync signal SYNC may be an image frame generation signal (VSYNC) or an image line generation signal (HSYNC) of the image logic circuit 230.

The DVS logic circuit 130 may include a row address event representation (AER) 131, a column AER 132, and an IO circuit 133.

The row AER 131 or the column AER 132 may process the event signal of each DVS pixel depending on an increase in a light signal (i.e., the change in the amount of light which may be incident light that is incident on one or more pixels of the pixel array PXA) and may provide the processed result to the IO circuit 133. The row AER 131 or the column AER 132 may transmit a reset signal to the DVS pixel circuit.

The row AER 131 may output a row address value of the DVS pixel where an event signal occurs. The row address value may be transmitted to the column AER 132 or the IO circuit 133.

The IO circuit 133 may output an event signal to an image signal processor (ISP) 235 or an external processor. In some example embodiments, the IO circuit 133 may output an event signal based on the sync signal SYNC provided by the image logic circuit 230. In this case, the event signal is stored in a memory (a capacitor or a memory circuit of a latch or flip-flop) and may be output based on the sync signal SYNC. In some example embodiments, the sync signal SYNC may be VSYNC or HSYNC.

The image logic circuit 230 generates an image frame signal having a frame format of the captured image based on charges generated by the photoelectric conversion device.

The image logic circuit 230 may include a row driving circuit 231, a controller 232, a column driving circuit 233, a read out circuit 234, and the ISP 235.

CIS pixels of the pixel array PXA may provide an output voltage on a row-by-row basis, one row at a time. The row driving circuit 231 provides the pixel array PXA with a plurality of driving signals for driving CIS pixels positioned in the same row.

The controller 232 (also referred to herein interchangeably as a control circuit) controls the row driving circuit 231 and the column driving circuit 233 for CIS pixels, and, to that end (e.g., to implement such control), provides the row driving circuit 231 and the column driving circuit 233 with control signals such as a clock signal, and a timing control signal.

CIS pixels belonging to the selected row provide the output voltage corresponding to a light signal to the output line of the column corresponding to each pixel.

The column driving circuit 233 may include a correlated double sampler (CDS), which removes noise by sampling the output of a pixel twice, and may decode an address in a column direction of the pixel array PXA.

According to some example embodiments of the present inventive concepts, when a CIS pixel and a DVS pixel share a photoelectric conversion device, a column driving circuit may output an analog image frame signal based on a log voltage having a logarithmic scale output by the DVS converting circuit.

The read out circuit 234 includes an amplifier that amplifies an output voltage of the column driving circuit 233 to generate the analog image frame signal. The read out circuit 234 may include an analog-to-digital converter (ADC) circuit that converts the analog image frame signal into a digital signal.

The ISP 235 may perform demosaicing by interpolating an image signal according to a CIS pixel pattern, may perform color correction, may adjust a dynamic range, or may reduce noise through filtering. The ISP 235 may additionally perform other methods of improving image quality.

Example embodiments described with reference to FIG. 6 are described on the premise that the DVS logic circuit 130 and the image logic circuit 230 are divided into separate circuits. However, some logics (e.g., some signals, e.g., signals from both a CIS pixel and a DVS pixel) may be processed with the same logic (e.g., the same logic circuit). For example, at least one of the column AER 132 or the IO circuit 133 may process a pixel signal output from a CIS pixel as well as an event signal output from a DVS pixel. In this case, the CDS for processing a pixel signal of a CIS pixel, the amplification circuit for amplifying an output voltage of the column driving circuit 233 and then generating an analog image frame signal, and the ADC circuit may be implemented in the inside or outside of the column AER 132 and the IO circuit 133 as a separate circuit.

Figure 7:
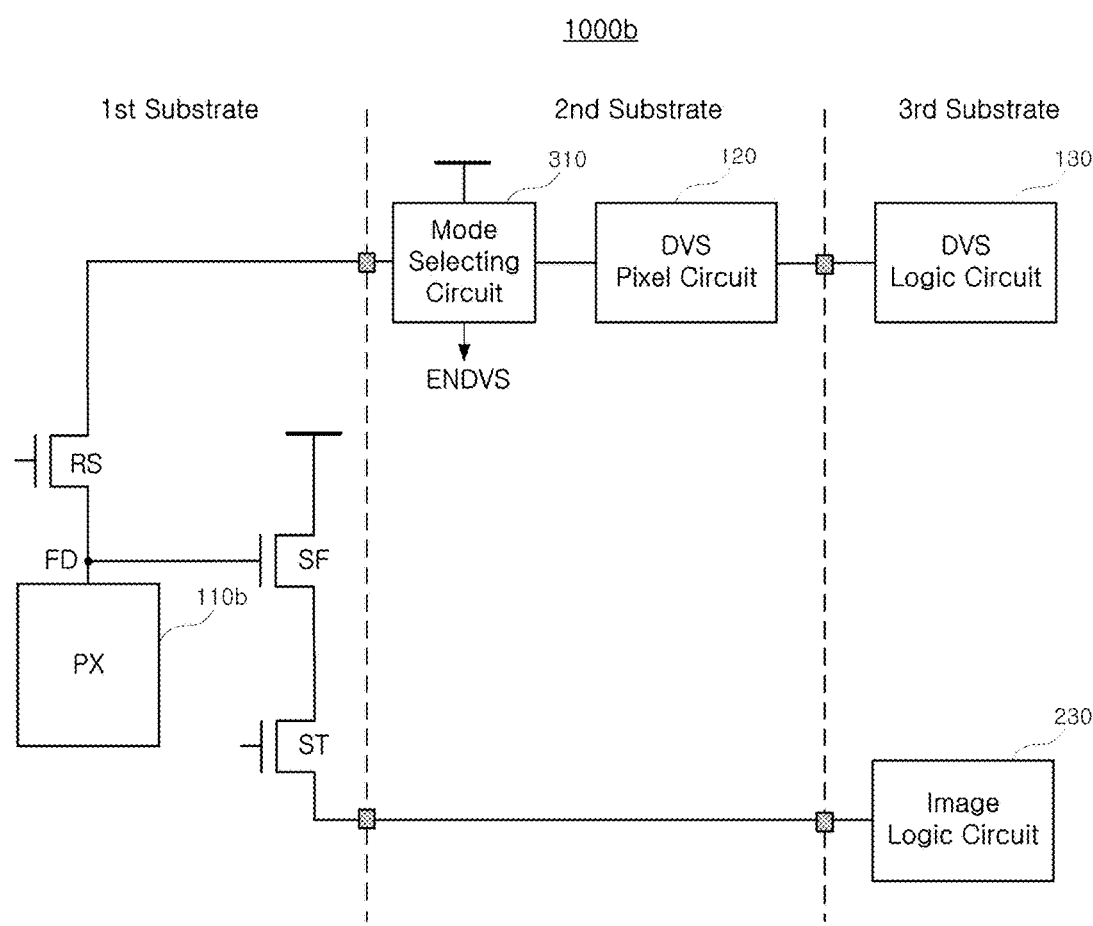
FIG. 7 is a block diagram of a DVS sensor including a plurality of substrates, according to some example embodiments of the present inventive concepts.
Figure 8:
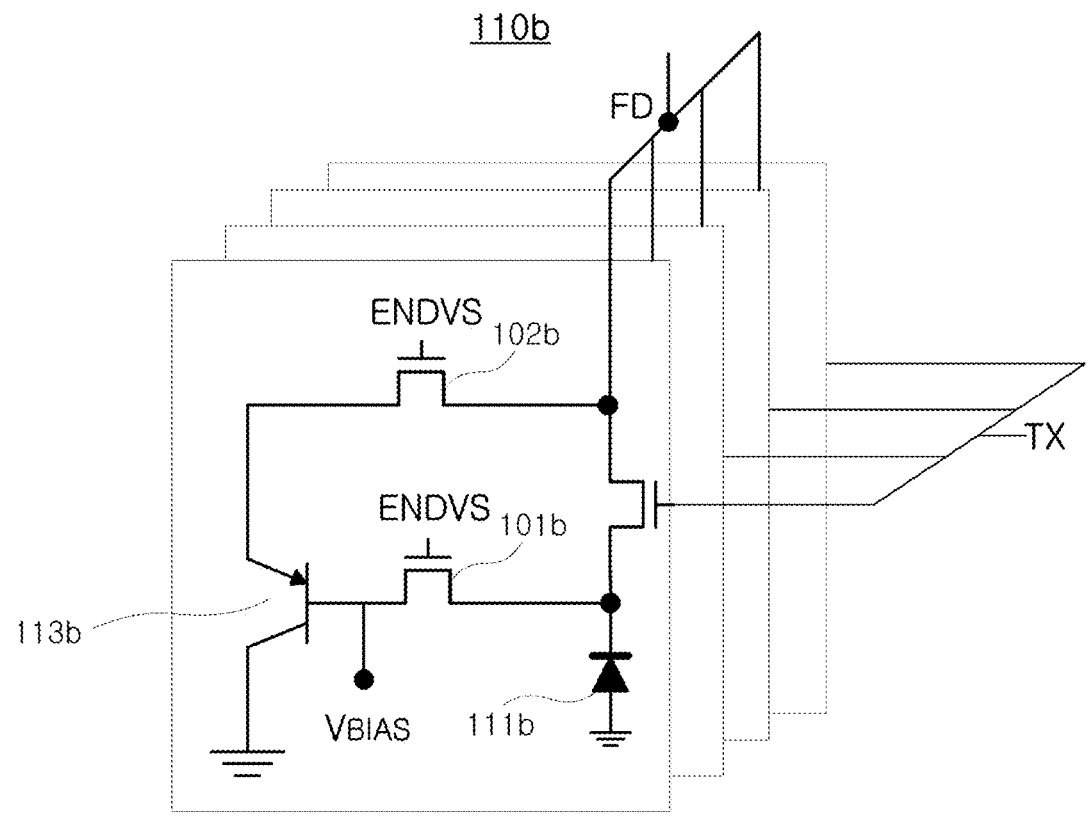
FIG. 8 is a circuit diagram of a pixel of a DVS sensor, according to some example embodiments of the present inventive concepts.

FIG. 7 is a block diagram of a DVS sensor 1000b including a plurality of substrates, according to some example embodiments of the present inventive concepts. FIG. 8 is a circuit diagram of a pixel of a DVS sensor, according to some example embodiments of the present inventive concepts.

The DVS sensor 1000b includes a DVS pixel 110b, transistor arrays RS, SF, and ST, a mode selecting circuit 310, the DVS pixel circuit 120, the DVS logic circuit 130, and the image logic circuit 230. Portions identical or similar to those described with reference to the previous drawings are simply described or omitted.

Depending on the selection of the mode selecting circuit 310, the reset transistor RS is connected to the DVS pixel circuit 120, or the DVS pixel 110b is connected to supply power. When the mode selecting circuit 310 selects a CIS image mode, the reset transistor RS is connected to the supply power. A BJT device 113b included in the DVS pixel 110b is electrically separated from the photoelectric conversion device 111b.

The DVS pixel 110b according to some example embodiments, including the example embodiments of FIG. 7 will be described in detail with reference to FIG. 8.

The DVS pixel 110b according to some example embodiments of the present inventive concepts includes a photoelectric conversion device 111b, a BJT device 113b, a first transistor 101b, a second transistor 102b, and a transfer transistor TX.

The first transistor 101b and the second transistor 102b receive a DVS mode select signal ENDVS of the mode selecting circuit 310 and connect the photoelectric conversion device 111b and the BJT device 113b.

The first transistor 101b connects the photoelectric conversion device 111b and the base of the BJT device 113b. The second transistor 102b connects the emitter of the BJT device 113b and a floating diffusion node FD.

When the mode selecting circuit 310 selects a CIS image mode, the BJT device 113b is electrically separated from the photoelectric conversion device 111b. In this case, the transfer transistor TX transmits charges generated by the photoelectric conversion device 111b to the floating diffusion node FD. In some example embodiments, in response to the mode selecting circuit 310 selecting a CIS image mode, the mode selecting circuit 310 may transmit a DVS mode select signal ENDVS that causes the first and second transistors 101b and 102b to be turned off (e.g., to be opened) to electrically separate (e.g., electrically isolate) the photoelectric conversion device 111b and the BJT device 113b. For example, the ENDVS may have a low logic level based on the mode selecting circuit 310 selecting the CIS image mode to cause the first and second transistors 101b and 102b to be opened. In another example, the ENDVS may have a high logic level based on the mode selecting circuit 310 selecting the DVS image mode to cause the first and second transistors 101b and 102b to be closed. As a result, the first and second transistors 101b and 102b may be configured to be closed in response to the DVS mode select signal ENDVS having a high level and to be opened in response to the DVS mode select signal ENDVS having a low level, but example embodiments are not limited thereto.

The floating diffusion node FD may be shared among the plurality of DVS pixels 110b. In the CIS image mode, the floating diffusion node FD may sequentially receive charges from the plurality of DVS pixels 110b. In some example embodiments, each DVS pixel 110b may be connected to a different floating diffusion node FD.

Each of the photoelectric conversion device 111b and the floating diffusion node FD may be set as one of a source node and a drain node of the transfer transistor TX. As transfer transistors TX1 to TX4 are turned on (e.g., closed), charges stored in the photoelectric conversion device 111b are sequentially transferred to the floating diffusion node FD.

In some example embodiments, similarly to FIG. 2, the DVS pixel 110b may include a resistor identically connected to the gate node of the BJT device 113b and the photoelectric conversion device 111b.

Returning to FIG. 7, as the reset transistor RS is turned on before the charges are transferred, the floating diffusion node FD in the CIS image mode may be reset to the supply power. The supply power is connected to the reset transistor RS through the mode selecting circuit 310. The reset level of the floating diffusion node FD may be recorded in a separate circuit to remove noise included in the transferred charges. A voltage at the floating diffusion node FD where the charges are stored is changed to a voltage proportional to the charges, and the floating diffusion node FD transfers the voltage to the gate node of a source follower transistor SF. Depending on the selection of the selection transistor ST, the source follower transistor SF outputs a voltage change of the gate node to the selection transistor ST. The selection transistor ST performs addressing by operating as a switching role. When a row select signal is applied, the selection transistor ST provides the voltage change received from the source follower transistor SF to the image logic circuit 230 through a column line.

Returning to FIG. 8, when the mode selecting circuit 310 selects a DVS mode, the first transistor 101b and the second transistor 102b are turned on (e.g., closed) by receiving the DVS mode select signal ENDVS of the mode selecting circuit 310 (e.g., based on receiving the DVS mode select signal ENDVS having a high level). The transfer transistor TX is not turned on (e.g., is not closed) in the DVS mode (e.g., in response to the mode selecting circuit 310 selecting the DVS mode). That is, the transfer transistor TX is turned off (e.g., is opened) in the DVS mode. In the DVS mode, the first transistor 101b and the second transistor 102b are turned on, and the transfer transistor TX is turned off. In this case, the DVS pixel 110b operates like the DVS pixel of FIG. 1. For example, in some example embodiments where the first and second transistors 101b and 102b are configured to be closed in response to the DVS mode select signal ENDVS having a high level (e.g., high logic level), the transfer transistor TX may be configured to be opened in response to the DVS mode select signal having the high level. In another example, in some example embodiments where the first and second transistors 101b and 102b are configured to be opened in response to the DVS mode select signal ENDVS having a low level (e.g., low logic level), the transfer transistor TX may be configured to be closed in response to the DVS mode select signal having the low level.

In the DVS mode, the reset transistor RS is turned on, and the mode selecting circuit 310 provides current of the DVS pixel 110b to the DVS pixel circuit 120 through a reset transistor. As described above, the DVS pixel circuit 120 generates the log voltage VLOG based on the current of the DVS pixel 110b, amplifies the log voltage in the differencing circuit 123, and outputs a result signal obtained by comparing the voltage amplified by the comparing circuit 125 with a reference voltage. It will be understood that a reference voltage as described herein may be a design parameter that may be empirically determined. The DVS logic circuit 130 outputs an event signal based on the result signal.

Among a plurality of substrates, the DVS pixel 110b and the transistor arrays RS, SF, and ST of the DVS sensor 1000b may be disposed on a first substrate; the mode selecting circuit 310 and the DVS pixel circuit 120 may be disposed on the second substrate; and the DVS logic circuit 130 and the image logic circuit 230 may be disposed on a third substrate. The second substrate may be interposed between the first and third substrates.

The DVS sensor 1000b according to some example embodiments, including the example embodiments of FIG. 7, may generate both the event signal according to the DVS mode and a general CIS image frame signal. Furthermore, a high fill factor may be achieved even when the transistor arrays RS, SF, and ST are positioned on the first substrate, by sharing the photoelectric conversion device 111b between the DVS pixel and the CIS pixel, and placing the DVS pixel circuit 120 on the second substrate, thereby improving the space efficiency of the DVS sensor 1000b and thus improving compactness and/or image sensing performance of the DVS sensor 1000b. Besides, the DVS sensor 1000b according to some example embodiments, including the example embodiments of FIG. 7 may stably generate an event signal even in low illuminance (e.g., even in response to the DVS sensor 1000b being in an external environment having a low illumination, low illuminance, etc.).

In some example embodiments, the event signal of the DVS logic circuit 130 and the image frame signal (CIS image) of the image logic circuit 230 may be output to the same output line. The image logic circuit 230 may generate VSYNC and HSYNC based on an external clock signal, and the image frame signal may be output to an output line based on the VSYNC or HSYNC. The event signal may be output to the same output line as the output of the image frame signal based on the sync signal SYNC provided by the image logic circuit 230. In some example embodiments, the event signal may be output through the same output line based on an internal sync signal of the DVS logic circuit 130 generated based on the sync signal SYNC.

Figure 9:
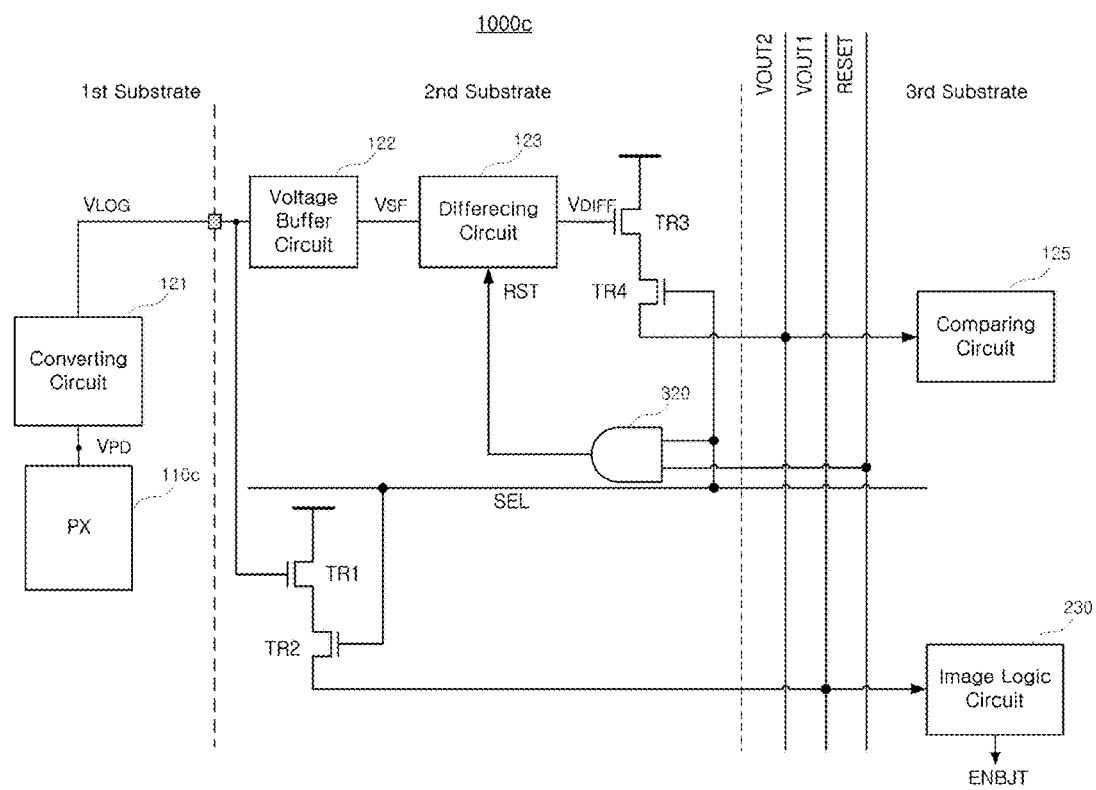
FIG. 9 is a block diagram of a DVS sensor including a plurality of substrates, according to some example embodiments of the present inventive concepts.
Figure 10:
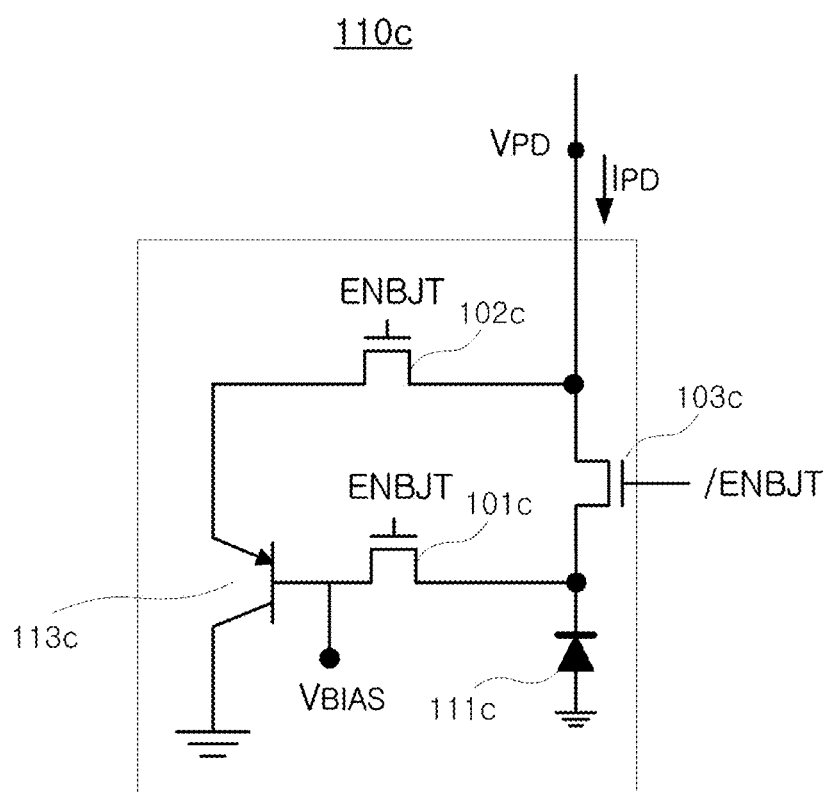
FIG. 10 is a circuit diagram of a pixel of a DVS sensor, according to some example embodiments of the present inventive concepts.
Figure 11:
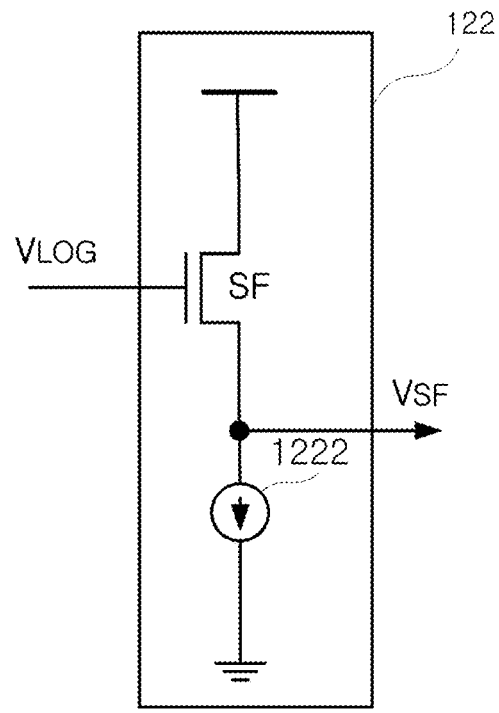
FIG. 11 is a circuit diagram of a voltage buffer of a DVS pixel circuit, according to some example embodiments of the present inventive concepts.

FIG. 9 is a block diagram of a DVS sensor 1000c including a plurality of substrates, according to some example embodiments of the present inventive concepts. FIG. 10 is a circuit diagram of a pixel of a DVS sensor, according to some example embodiments of the present inventive concepts. FIG. 11 is a circuit diagram of a voltage buffer of a DVS pixel circuit, according to some example embodiments of the present inventive concepts.

The DVS sensor 1000c includes a DVS pixel 110c, the converting circuit 121, a voltage buffer circuit 122, the differencing circuit 123, the comparing circuit 125, a logic gate circuit 320, image transistor arrays TR1 and TR2, and DVS transistor arrays TR3 and TR4. Portions identical or similar to those described with reference to the previous drawings are simply described or omitted.

According to some example embodiments of the present inventive concepts, the DVS sensor 1000c may generate a comparison signal VDIFF for an analog image frame signal and an event signal depending on incident light based on the log voltage VLOG.

The DVS pixel 110c according to some example embodiments, including the example embodiments of FIG. 9 will be described in detail with reference to FIG. 10.

The DVS pixel 110c according to some example embodiments of the present inventive concepts includes a photoelectric conversion device 111c, a BJT device 113c, a first transistor 101c, a second transistor 102c, and a third transistor 103c.

The first transistor 101c connects the photoelectric conversion device 111c and the base of the BJT device 113c. The second transistor 102c connects the emitter of the BJT device 113c and the output terminal of the DVS pixel 110c. The third transistor 103c connects the photoelectric conversion device 111c and the output terminal of the DVS pixel 110c.

The first transistor 101c and the second transistor 102c are turned on by receiving a BJT device activation signal ENBJT, and the third transistor 103c is turned off in response to the BJT device activation signal ENBJT. The BJT device activation signal ENBJT may be generated by one or more of the image logic circuit 230, an external device (e.g., a photoresistor) that is external to the DVS sensor 1000c, or any combination thereof, based on processing one or more signals received based on incident light on the photoelectric conversion device 111c. For example, the image logic circuit 230 may be configured to generate the BJT device activation signal ENBJT based on processing an image frame signal to determine a change of an illumination (e.g., illuminance, incident light intensity) of an external environment and comparing the determined change of the illumination against a particular reference value (e.g., a reference illuminance, reference incident light intensity, reference intensity value etc.) to determine if the illumination of an external environment is high (e.g., greater than or equal to the particular reference illumination) or low (e.g., lower than the particular reference illumination), or if the change of an illumination of the external environment is low and generating the BJT device activation signal ENBJT to have a low or high logic level based on whether the illumination of the external environment is high or low, respectively. The image frame signal is generated based on an intensity of the illumination of the external environment by the DVS pixel 110c. So, the image logic circuit 230 may be configured to compare a value of the image frame signal with a reference value. The particular reference illumination may be stored at a portion of the DVS sensor 1000c (e.g., a register memory of the DVS sensor 1000c, or the like) and may be accessed by the element performing the processing an image frame signal to determine whether the illumination of the external environment is greater than, equal to, or less than the particular reference illumination (e.g., the image logic circuit 230). It will be understood that a reference illumination as described herein may be a design parameter that may be empirically determined.

The DVS pixel 110c operates like the DVS pixel in FIG. 1 by receiving the BJT device activation signal ENBJT.

In some example embodiments, similarly to FIG. 2, the DVS pixel 110b may include a resistor identically connected to the gate node of the BJT device 113b and the photoelectric conversion device 111b.

When the BJT device activation signal ENBJT is at a low level (e.g., low logic level), for example in response to a determination that the illumination of the external environment is high, the BJT device 113c is electrically separated from the photoelectric conversion device 111c (e.g., based on at least the first transistor 101c and the second transistor 102c being opened). In this case, the third transistor 103c transmits charges generated by the photoelectric conversion device 111c to the converting circuit 121 (e.g., based on the third transistor 103c being closed in response to the BJT device activation signal ENBJT being at the low level).

The converting circuit 121 converts a current flowing through the photoelectric conversion device 111c into the log voltage VLOG. The log voltage VLOG is delivered to the gate node of a first transistor TR1, which is a source follower transistor (also referred to herein as a first source follower transistors). The first transistor TR1 outputs a voltage change of the gate node to a second transistor TR2 depending on the selection of the second transistor TR2. The second transistor TR2 performs addressing by operating as a switching role. When a select signal SEL is applied, the voltage change received from the first transistor TR1 is provided to the image logic circuit 230 through an output line VOUT1. Such a voltage change that is output by the first transistor TR1 may, in some example embodiments, be an analog image frame signal, which may be understood to be output by the first transistor TR1 based on the log voltage VLOG, where the image logic circuit 230 may generate a digital image frame signal based on the analog image frame signal. In this case, because the image logic circuit 230 generates an image frame signal (e.g., a digital image frame signal) based on the log voltage VLOG, the photoelectric conversion device 111c operates as a logarithmic image pixel. The image frame signal may be generated for each row based on HSYNC.

The log voltage VLOG converted based on the current flowing through the photoelectric conversion device 111c is delivered to the voltage buffer circuit 122.

The voltage buffer circuit 122 will be described in detail with reference to FIG. 11.

Referring to FIG. 11, the voltage buffer circuit 122 includes the source follower transistor SF and a current source 1222. The gate node of the source follower transistor SF is connected to the converting circuit 121. The source node of the source follower transistor SF is connected to a current source 1222. The source follower transistor SF generates a source follower voltage VSF based on the log voltage VLOG.

Referring back to FIG. 9, even though the converting circuit 121 is disposed on the first substrate and the comparing circuit 125 is disposed on the third substrate in some example embodiments, the voltage buffer circuit 122 generates the source follower voltage VSF based on the log voltage VLOG, thereby stably transmitting a signal to the comparing circuit 125.

Returning to FIG. 9, the source follower voltage VSF is supplied to the differencing circuit 123. The differencing circuit 123 outputs the amplification voltage VDIFF to the gate node of a third transistor TR3. The third transistor TR3, which may also be interchangeably referred to herein as a second source follower transistor, outputs a voltage change of the gate node to a fourth transistor TR4 depending on the selection of the fourth transistor TR4. The fourth transistor TR4 is turned on in response to the select signal SEL. When the select signal SEL is applied, the fourth transistor TR4 provides the voltage change received from the third transistor TR3 to the comparing circuit 125 disposed on the third substrate through an output line VOUT2. In some example embodiments, the output of the third transistor TR3, which may be a voltage change of the gate node thereof based on the output of the differencing circuit 123, may be understood to be the output of the differencing circuit 123, such that the third transistor TR3 may be understood to be configured to receive an output of the differencing circuit 123 at a gate node of the third transistor TR3 and to provide a comparing circuit 125 with the output of the differencing circuit 123.

When both a reset signal RESET and the select signal SEL are at high levels, the logic gate circuit 320 outputs an output signal RST. When the output signal RST of the logic gate circuit 320 is at a high level, the differencing circuit 123 is reset.

When the BJT device activation signal ENBJT is at a high level, for example in response to a determination that the illumination of the external environment is low, the converting circuit 121 converts the current amplified by the BJT device 113c into the log voltage VLOG. The subsequent operation is the same as the operation in a case where the BJT device activation signal ENBJT described above is at a low level.

Accordingly, both an event signal and an image frame signal may be generated based on the log voltage VLOG.

The event signal and the image frame signal may be output based on the sync signal SYNC provided by the image logic circuit 230. The event signal and the image frame signal may be respectively output to different output lines and may be transmitted to an external processor. When the HSYNC signal is at a high level, the image logic circuit 230 generates image frame signals of a plurality of lines, and transmits an image frame signal to an external processor through an output line. The image logic circuit 230 may output the event signal to an output line, which is different from an output line of the image frame signal, based on the sync signal SYNC or an internal sync signal of the DVS logic circuit based on the sync signal SYNC. The event signal may be transmitted to the external processor. The sync signal SYNC may be VSYNC or HSYNC.

In some example embodiments, the event signal and the image frame signal may be output to the same output line and may be transmitted to the external processor. In this case, the event signal and the image frame signal may be output to the same output line based on the sync signal SYNC at different time points. The sync signal SYNC may be VSYNC or HSYNC. The event signal may be stored in a memory (a capacitor or a memory circuit of a latch or flip-flop) and may be output to the output line at a point in time when the image frame signal is not output. According to some example embodiments, the event signal and the image frame signal are alternately output to the same output line and may be transmitted to the external processor.

Moreover, when an external environment is at high illumination (e.g., high illuminance), the BJT device activation signal ENBJT is transmitted at a low level. When an external environment is at low illumination, the BJT device activation signal ENBJT is transmitted at a high level. As described above, the first and second transistors 101c and 102c may be selectively closed and the third transistor 103c may be selectively opened, such that the BJT device 113c is selectively activated, based on the BJT device activation signal ENBJT having a high level, and the first and second transistors 101c and 102c may be selectively opened and the third transistor 103c may be selectively closed, such that the BJT device 113c is selectively deactivated, based on the BJT device activation signal ENBJT having a low level. Accordingly, the BJT device 113c may be activated selectively in consideration of the illumination (e.g., illuminance) of the external environment. In other words, when (e.g., in response to a determination that) the illuminance (e.g., illumination) of the external environment is lower than the particular (or, alternatively, predetermined) reference illumination (e.g., a particular reference illuminance), which may be stored, for example at the image logic circuit 230 and/or a resister memory of the DVS sensor 1000c, the DVS sensor 1000c transmits the BJT device activation signal ENBJT at a high level, and may generate the log voltage VLOG based on the current amplified by the BJT device 113c. In view of at least the above, the DVS sensor 1000c may be configured to quickly and reliably switch between activating or deactivating the BJT device 113c according to the illumination of the external environment, thereby enabling event signals to be generated quicker and more reliably and enabling the DVS sensor 1000c to generate images having reduced, minimized, or prevented object drag due to reducing, minimizing, or preventing issues of small current flowing through the photoelectric conversion device 111c when the DVS sensor 1000c is in a low-light environment (e.g., when the illumination of the external environment is less than the particular reference illumination). In other words, sensitivity of the DVS sensor 1000c sensor may be controlled according to the illumination of the external environment. In a very bright environment, the DVS sensor 1000c sensor may be configured to have low sensitivity by deactivating the BJT device 113c. And the DVS sensor 1000c sensor may be configured to have high sensitivity by activating the BJT device 113c. So, the DVS sensor 1000c sensor can operate stably regardless of the illumination of the external environment. And it is possible to reduce a drag phenomenon of an object in an event signal in the low-light environment and to prevent the event signal and/or the image signal frame being saturated in the very bright environment. It will be understood that a reference illumination, reference illuminance, or the like as described herein may be a design parameter that may be empirically determined.

In some example embodiments, finally, the event signal and image frame signal may be simultaneously output to different output lines. In this case, the event signal may be output in synchronization with the sync signal SYNC provided by the image logic circuit 230. The sync signal SYNC may be VSYNC or HSYNC.

In some example embodiments, finally, the event signal and the image frame signal may be output to the same output line. In this case, the event signal is output at a different time point from a time point of the image frame signal. However, the event signal may be output in synchronization with the sync signal SYNC provided by the image logic circuit 230. The sync signal SYNC may be VSYNC or HSYNC.

Figure 12:
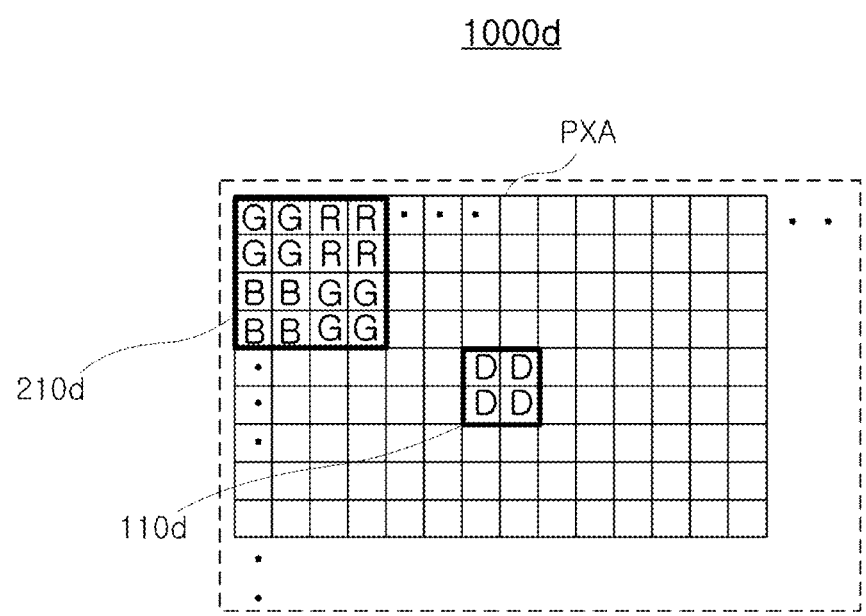
FIG. 12 is a diagram illustrating a pixel array of a DVS sensor, according to some example embodiments of the present inventive concepts.

FIG. 12 is a diagram illustrating a pixel array of a DVS sensor 1000d, according to some example embodiments of the present inventive concepts. FIG. 13 is a block diagram of a DVS sensor 1000d including a plurality of substrates, according to some example embodiments, including the example embodiments of FIG. 12.

Referring to FIG. 12, the pixel array PXA separately includes a CIS pixel 210d and a DVS pixel 110d. The CIS pixel 210d is identified separately for each color. The CIS pixel 210d includes a first photoelectric conversion device, and the DVS pixel 110d includes a second photoelectric conversion device. In other words, the CIS pixel 210d and the DVS pixel 110d do not share a photoelectric conversion device.

The number (e.g., quantity) of DVS pixels 110d may be less than the number (e.g., quantity) of CIS pixels 210d.

As described above, the DVS pixel 110d includes a BJT device, and outputs a photocurrent amplified by the BJT device. The amplified photocurrent is provided to a DVS pixel circuit. As described above, the DVS pixel circuit includes a converting circuit that outputs the log voltage VLOG, a differencing circuit, and a comparing circuit. The DVS pixel circuit may further include a voltage buffer circuit. The DVS pixel circuit outputs an event signal based on the photocurrent.

The CIS pixel 210d transmits the analog image frame signal to the image logic circuit through a transistor array (including a transfer transistor, a source follower transistor, a selection transistor, and a reset transistor) based on charges accumulated in the first photoelectric conversion device. The image logic circuit outputs a digital image frame signal based on an analog image frame signal.

Referring to FIG. 13, a plurality of DVS pixels (PDD) 110d are connected to the same BJT device. Among a plurality of substrates, the DVS pixel PDD 110d is disposed on a first substrate, and the BJT device is disposed on a second substrate. The DVS pixel PDD 110d and BJT device may be connected to each other by in-pixel C2C bonding or in-pixel TSV. The DVS pixel circuit is disposed on the second substrate. Accordingly, the DVS pixel may be separately disposed on the first substrate without compromising the fill factor of CIS pixels, by placing both the DVS pixel circuit and the BJT device on the second substrate. The BJT device may be configured to amplify currents flowing in the plurality of photoelectric conversion devices of the plurality of DVS pixels PDD 110*d* and to output the photocurrent to the DVS pixel circuit based on amplifying the currents flowing in the plurality of second photoelectric conversion devices (e.g., the plurality of DVS pixels PDD 110*d*).

A binning operation may be performed by the CIS pixel PDC 210*d* of the DVS sensor 1000*d* according to some example embodiments, including the example embodiments of FIG. 13. In this case, the floating diffusion node of the transfer transistor sequentially receives charge from the photoelectric conversion devices of the plurality of CIS pixels PDC 210*d*. The image logic circuit stores the charges sequentially received by the floating diffusion node, and then the image logic circuit may generate a digital image frame signal by binning the analog image frame signal. That is, as both the DVS pixel circuit and the BJT device are placed on the second substrate, more CIS pixels may be disposed on the first substrate.

An image logic circuit, a DVS logic circuit, a data bus (DBS) control circuit, a voltage doubler (DBR) circuit, and the like may be disposed on the lower plate (e.g., the third substrate) of the DVS sensor 1000*d* according to some example embodiments of FIG. 13.

At least part of the image logic circuit and the DVS logic circuit may be implemented in one logic circuit or in a separate logic circuit (e.g., in separate logic circuits).

The event signal and image frame signal may be simultaneously output to different output lines. In this case, the event signal may be output in synchronization with the sync signal SYNC provided by the image logic circuit 230. The sync signal SYNC may be VSYNC or HSYNC.

Figure 14:
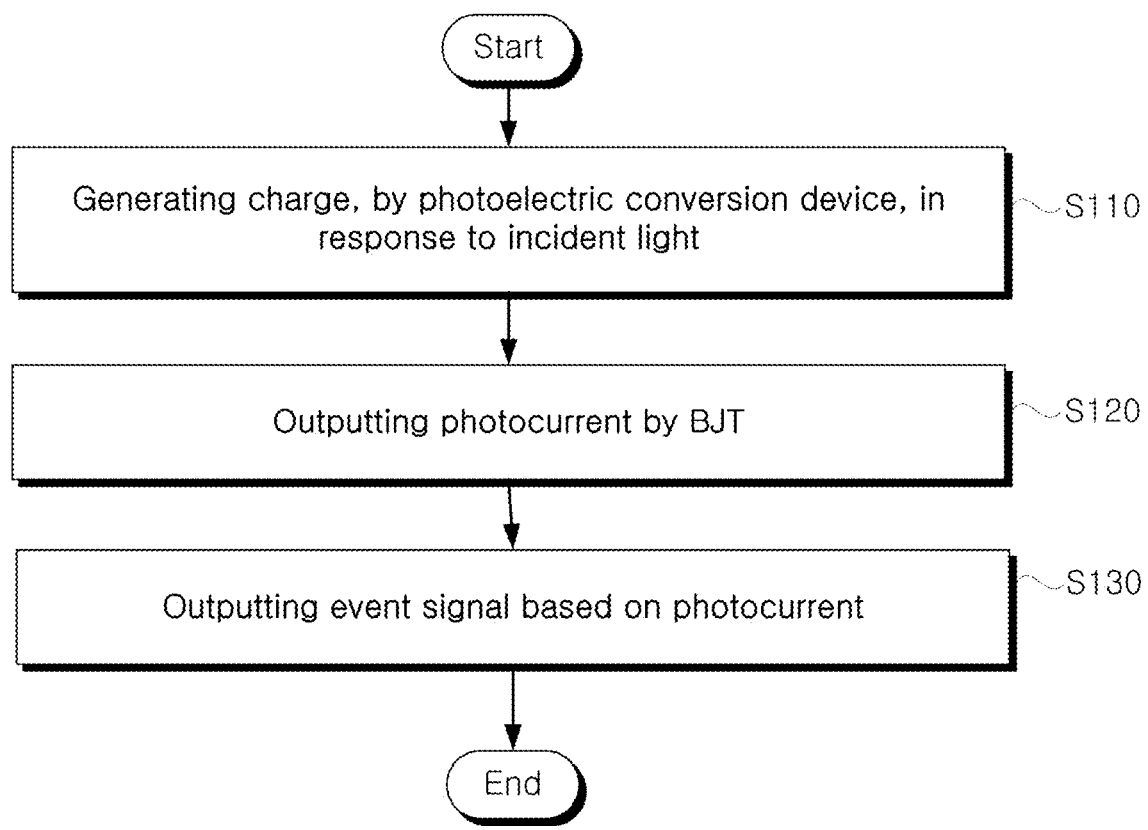
FIG. 14 is a flowchart of a method of operating a DVS sensor, according to some example embodiments of the present inventive concepts.

FIG. 14 is a flowchart of a method of operating a DVS sensor, according to some example embodiments of the present inventive concepts.

An operating method of a DVS sensor may be performed in a DVS sensor including a plurality of substrates electrically connected to one another and vertically stacked. The DVS sensor may be one of the DVS sensors previously described with reference to FIGS. 1 to 13.

A photoelectric conversion device of the DVS pixel placed on the first substrate among a plurality of substrates stacked in the DVS sensor generates charges in response to incident light from the outside (S110). The photoelectric conversion device is one of a photodiode, a photocapacitor, a photogate, a pinned photodiode, or a partially pinned photodiode, or any combination thereof. The DVS pixel may have a BSI structure.

A BJT device included in the DVS pixel according to some example embodiments of the present inventive concepts and including a base connected to the photoelectric conversion device outputs a photocurrent for amplifying the current flowing through the photoelectric conversion device (S120).

The photocurrent output by the BJT device is greater than the current flowing through the photoelectric conversion device. Accordingly, it is possible to reduce a drag phenomenon of an object in an event signal due to a decrease in a current flowing through the photoelectric conversion device in a low-light environment (e.g., an environment where the illumination, or illuminance, of the external environment is less than a particular reference illumination or illuminance, etc.).

The DVS pixel may include a resistor connected to the photoelectric conversion device and the base of the BJT device. In this case, the DVS pixel may output a photocurrent smaller than a photocurrent in the case where only the photoelectric conversion device is connected to the base of BJT device.

The photocurrent output by the BJT device is delivered to the DVS pixel circuit as an output of the DVS pixel. The DVS pixel circuit outputs the event signal based on the photocurrent (S130). The DVS pixel circuit may be disposed on a different substrate from a substrate on which DVS pixels are disposed. For example, when the DVS sensor consists of and/or includes three substrates, the DVS pixels may be disposed on a first substrate, and the DVS pixel circuit may be disposed on a second substrate or a third substrate.

In the meantime, the above description refers to detailed example embodiments for carrying out the present inventive concepts. Example embodiments in which a design is changed simply or which are easily changed may be included in the present inventive concepts as well as some example embodiments described above. In addition, technologies that are easily changed and implemented by using the above example embodiments may be included in the present inventive concepts.

A DVS sensor according to some example embodiments of the present inventive concepts may reduce a time required to generate an event signal in a low-light environment.

As described herein, any devices, systems, units, blocks, circuits, controllers, processors, and/or portions thereof according to any of the example embodiments (including, for example, the DVS sensor 1000, the DVS pixel 110, the DVS pixel circuit 120, the DVS pixel 110*a*, the converting circuit 121, the differencing circuit 123, the comparing circuit 125, the I/O and handshake circuit 127, the DVS logic circuit 130, the row AER 131, the column AER 132, the IO circuit 133, the image logic circuit 230, the controller 232, the row driving circuit 231, the column driving circuit 233, the read out circuit 234, the ISP 235, the DVS sensor 1000*b*, the mode selecting circuit 310, the DVS pixel 110*b*, the DVS sensor 1000*c*, the voltage buffer circuit 122, the logic gate circuit 320, the DVS sensor 1000*d*, any portion thereof, or the like) may include, may be included in, and/or may be implemented by one or more instances of processing circuitry such as hardware including logic circuits; a hardware/software combination such as a processor executing software; or any combination thereof. For example, the processing circuitry more specifically may include, but is not limited to, a central processing unit (CPU), an arithmetic logic unit (ALU), a graphics processing unit (GPU), an application processor (AP), a digital signal processor (DSP), a microcomputer, a field programmable gate array (FPGA), and programmable logic unit, a microprocessor, application-specific integrated circuit (ASIC), a neural network processing unit (NPU), an Electronic Control Unit (ECU), an Image Signal Processor (ISP), and the like. In some example embodiments, the processing circuitry may include a non-transitory computer readable storage device (e.g., a memory), for example a solid-state drive memory device, storing a program of instructions, and a processor (e.g., CPU) configured to execute the program of instructions to implement the functionality and/or methods performed by some or all of any devices, systems, units, blocks, circuits, controllers, processors, and/or portions thereof according to any of the example embodiments.

While the present inventive concepts have been described with reference to some example embodiments thereof, it will be apparent to those of ordinary skill in the art that various changes and modifications may be made thereto without departing from the spirit and scope of the present inventive concepts as set forth in the following claims.

What is claimed is:

1. A dynamic vision sensor (DVS) sensor including a plurality of substrates electrically connected to one another and stacked vertically, the DVS sensor comprising:
a photoelectric conversion device configured to generate charges in response to incident light;
a bipolar junction transistor (BJT) device including a base connected to the photoelectric conversion device and configured to output a current based on a current output from the photoelectric conversion device; and
a DVS pixel circuit configured to detect a change in intensity of the incident light and to output an event signal based on the current output from the BJT device,
wherein the photoelectric conversion device is on a first substrate among the plurality of substrates, and
wherein at least part of the DVS pixel circuit is on a different substrate from the first substrate among the plurality of substrates.

2. The DVS sensor of claim 1, wherein
the DVS pixel circuit includes a converting circuit configured to output a logarithmic scale voltage based on the current output from the BJT device,
wherein the DVS pixel circuit is configured to generate the event signal based on the logarithmic scale voltage, and
wherein the converting circuit is on the first substrate or on the different substrate.

3. The DVS sensor of claim 1, further comprising:
an image logic circuit configured to generate an image frame signal based on a voltage corresponding to a charge generated by the photoelectric conversion device,
wherein the at least part of the DVS pixel circuit is on a second substrate among the plurality of substrates, and
wherein the image logic circuit is on a third substrate among the plurality of substrates, and the second substrate is between the first substrate and the third substrate.

4. The DVS sensor of claim 1, wherein the base of the BJT device and the photoelectric conversion device are connected to each other through a first transistor, and the first transistor is configured to be closed in response to a determination that the change in intensity of the incident light is lower than a particular reference value.

5. The DVS sensor of claim 1, wherein the photoelectric conversion device and the base of the BJT device are connected to a same resistor, and a base current of the BJT device is configured to be smaller than a current flowing in the photoelectric conversion device.

6. The DVS sensor of claim 2, further comprising:
a transfer transistor configured to transmit a charge generated by the photoelectric conversion device to a floating diffusion node;
a source follower transistor configured to output a voltage signal in response to a charge of the floating diffusion node;
a first transistor between the photoelectric conversion device and the base of the BJT device; and
a second transistor between the floating diffusion node and an emitter of the BJT device,
wherein each of the first transistor and the second transistor is configured to be closed in a DVS mode, and
wherein the transfer transistor is configured to be opened in the DVS mode.

7. The DVS sensor of claim 6, further comprising:
a reset transistor connected to the floating diffusion node; and
a mode selecting circuit configured to connect the reset transistor to the DVS pixel circuit in the DVS mode and to connect the reset transistor to a power supply terminal in an image mode.

8. The DVS sensor of claim 2, further comprising:
a first source follower transistor configured to output an analog image frame signal based on the logarithmic scale voltage.

9. The DVS sensor of claim 8, wherein the DVS pixel circuit includes:
a voltage buffer circuit configured to receive an output of the converting circuit;
a differencing circuit connected to the voltage buffer circuit; and
a second source follower transistor configured to receive an output of the differencing circuit at a gate node of the second source follower transistor and to provide a comparing circuit with the output of the differencing circuit.

10. The DVS sensor of claim 9, wherein respective outputs of the analog image frame signal and the differencing circuit are output through different output lines from each other.

11. The DVS sensor of claim 10, wherein the respective outputs of the analog image frame signal and the differencing circuit are output in response to a same select signal.

12. The DVS sensor of claim 8, wherein the converting circuit is configured to output the logarithmic scale voltage based on the current provided by the BJT device in response to a determination that the change in intensity of the incident light is lower than a particular reference value.

13. The DVS sensor of claim 12, further comprising:
a first transistor between the photoelectric conversion device and the base of the BJT device;
a second transistor between the converting circuit and an emitter of the BJT device; and
a third transistor between the converting circuit and the photoelectric conversion device,
wherein each of the first transistor and the second transistor is configured to be closed in response to the determination that the change in intensity of the incident light is lower than the particular reference value, and the third transistor is configured to be opened in response to the determination that the change in intensity of the incident light is lower than the particular reference value.

14. The DVS sensor of claim 8, wherein the DVS pixel circuit further includes:
a voltage buffer circuit configured to receive an output of the converting circuit;
a differencing circuit connected to the voltage buffer circuit; and
a comparing circuit configured to receive an output of the differencing circuit.

15. The DVS sensor of claim 14, wherein the comparing circuit is on the different substrate.

16. A dynamic vision sensor (DVS) sensor including a plurality of substrates electrically connected to each other and stacked vertically, the DVS sensor comprising:
- a first photoelectric conversion device and a second photoelectric conversion device, each of the first photoelectric conversion device and the second photoelectric conversion device configured to generate charges in response to incident light;
- a transistor array configured to output an analog image frame signal based on a charge generated by the first photoelectric conversion device;
- a bipolar junction transistor (BJT) device connected to the second photoelectric conversion device;
- a DVS pixel circuit configured to output an event signal based on a photocurrent, the photocurrent being output based on the BJT device amplifying a current flowing to the second photoelectric conversion device; and
- an image logic circuit configured to convert the analog image frame signal into a digital image frame signal,
- wherein the first photoelectric conversion device and the second photoelectric conversion device are on a first substrate among the plurality of substrates, at least part of the DVS pixel circuit is on a second substrate among the plurality of substrates, the image logic circuit is on a third substrate among the plurality of substrates, and the second substrate is between the first substrate and the third substrate.

17. The DVS sensor of claim 16, wherein
the transistor array includes a floating diffusion node,
the DVS sensor includes a plurality of first photoelectric conversion devices, the plurality of first photoelectric conversion devices including the first photoelectric conversion device, and the floating diffusion node is configured to sequentially receive charges from the plurality of first photoelectric conversion devices, and
the image logic circuit is configured to bin the analog image frame signal based on the charges sequentially received by the floating diffusion node.

18. The DVS sensor of claim 16, wherein the BJT device is on the second substrate.

19. The DVS sensor of claim 18, wherein the DVS sensor includes a plurality of second photoelectric conversion devices, the plurality of second photoelectric conversion devices including the second photoelectric conversion device, and the BJT device is configured to amplify currents flowing in the plurality of second photoelectric conversion devices and to output the photocurrent based on the amplified currents.

20. An operating method of a dynamic vision sensor (DVS) sensor including a plurality of substrates electrically connected to each other and stacked vertically, the operating method comprising:
- generating, by a photoelectric conversion device on a first substrate among the plurality of substrates, charges in response to incident light;
- outputting, by a bipolar junction transistor (BJT) device having a base connected to the photoelectric conversion device, a photocurrent based on amplifying a current flowing in the photoelectric conversion device; and
- outputting, by a DVS pixel circuit on a different substrate from the first substrate among the plurality of substrates, an event signal based on the photocurrent output by the BJT device.

* * * * *